(12) United States Patent
Kobayashi et al.

(10) Patent No.: US 6,483,659 B1
(45) Date of Patent: Nov. 19, 2002

(54) DISK DRIVES

(75) Inventors: Masahito Kobayashi, Ushiku (JP);
Takashi Yamaguchi, Tsuchiura (JP);
Kenichi Iimura, Funabashi (JP); Irizo Naniwa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/421,943

(22) Filed: Oct. 21, 1999

(30) Foreign Application Priority Data

Oct. 23, 1998 (JP) .......................................... 10-302396

(51) Int. Cl.$^7$ .............................................. G11B 5/596
(52) U.S. Cl. .................................. 360/78.04; 360/78.05
(58) Field of Search .......................... 360/78.04, 78.05, 360/75, 78.12; 369/44.28–44.3

(56) References Cited

U.S. PATENT DOCUMENTS 5,189,578 A * 2/1993 Mori et al. .......... 360/78.05 X
5,404,255 A * 4/1995 Kobayashi et al. .. 360/78.05 X
6,160,676 A * 12/2000 Takaishi .................. 360/78.05

FOREIGN PATENT DOCUMENTS

JP      A-4-368676      12/1992

* cited by examiner

Primary Examiner—David Hudspeth
Assistant Examiner—K. Wong
(74) Attorney, Agent, or Firm—Antonelli, Terry, Stout & Kraus, LLP

(57) ABSTRACT

A disk drive capable of controlling two or more high-response small-stroke precise-movement actuators and a low-response large-stroke rough-movement actuator to be operated in cooperation with each other so that two or more heads can be fast and precisely positioned at a time by those actuators. The disk drive includes a rough-movement actuator having a stroke enough to cover all disk, a first precise-movement actuator having a small stroke, and a second precise-movement actuator having a small stroke, wherein a head is positioned at a track on a disk surface by the first precise-movement actuator, at the same time a head is positioned at a track on a second disk surface by the second precise-movement actuator, and the rough-movement actuator is operated to follow and to be brought to a center position between the located heads.

6 Claims, 9 Drawing Sheets

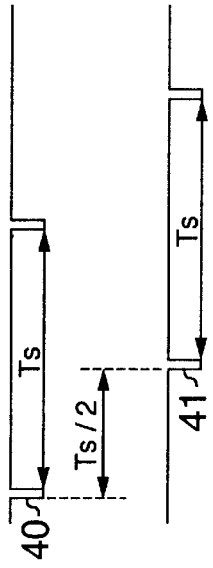
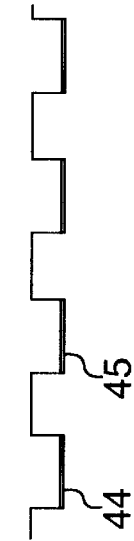
FIG.2A POSITION SIGNAL INTERRUPSION FLAG OF HEAD A
FIG.2B POSITION SIGNAL INTERRUPSION FLAG OF HEAD B
FIG.2C A/D CONVERTION FLAG FOR POSITION SIGNAL DEMODULATOR
FIG.2D ARITHMETIC OPERATION OF MICROPROCESSOR
FIG.2E D/A CONVERSION FLAG FOR ACTUATOR A
FIG.2F D/A CONVERSION FLAG FOR ACTUATOR B
FIG.2G D/A CONVERSION FLAG FOR ROUGH ACTUATOR

DISK DRIVES

BACKGROUND OF THE INVENTION

1. Field of the Invention

The present invention relates to disk drives such as magnetic disk drives and optical disk drives, and particularly to a disk drive capable of high-speed high-precision positioning operation by cooperation between a high-response, small-stroke precise-movement actuator and a low-response, large-stroke rough-movement actuator.

2. Description of the Related Art

In order for a disk drive, for example, magnetic disk drive to access high-density recorded information with high speed, it is required that the magnetic head driven by the actuators be fast moved to a desired track (seek control) and forced to precisely follow the center of the desired track (following control). For this requirement, it is necessary to reduce the weight of the actuators and widen the frequency band of the positioning control system. The reduction of weight, however, will lower the rigidity. Thus, the upper mechanical resonance frequency of the actuators has a constant limit, and the frequency band of the positioning control system is restricted thereby. The current magnetic disk drive traces tracks about 3 μm wide and positions the heads with an accuracy of about 0.3 μm. In future, the magnetic disk drive will be required to trace tracks of less than 1 μm in width and position the head with an accuracy of less than 0.1 μm. In order to achieve this positioning precision, it is necessary to widen the frequency band of the control system from the present value of about 500 Hz to 2 kHz or higher.

There is a known technique in which the magnetic head can be positioned with high speed and with high precision by a combination of a rough-movement actuator formed of a voice coil motor and precise-movement actuators formed of piezo-electric elements or the like. For example, a gazette of JP-A-4-368676 discloses the technique in which the control system for the rough-movement actuator and the control system for the precise-movement actuators are cooperated to widen the frequency band of the control system.

The prior art solved a problem with the positioning control technique by use of precise-movement and rough-movement actuators for a single particular head specified by the host controller. However, many problems remain unsolved with the positioning control technique in which two or more heads using precise-movement and rough-movement actuators are simultaneously controlled with high speed and with high precision.

If data on the same cylinder can be read at a time by two or more heads, it will be possible to transfer a large amount of data to the host controller. To achieve fast data transfer, it is important to fundamentally increase the bit density and fast rotate the disk, but the increase of bit density is limited by the magnetic interference problem and a problem with the circuits for data transfer. Thus, if a plurality of data can be written and read at a time, data can be fast transferred without increasing the bit density.

In addition, if positional information previously recorded on disks can also be read at a time by two or more heads, the heads can be successively switched on the same cylinder. To achieve continuous transfer of data, it is important to fundamentally make the head switching transition time zero. However, the heads are shifted a few μm or below due to the deformation caused by the heat from the carriage that support many heads. Thus, the head switching settling time cannot be made zero. If the positioning information can be read at a time by two or more heads, it is possible that while data is being read or written by a certain head, a preselected head is positioned on a predetermined cylinder, thus the head switching transition time being made zero. Therefore, it is important to establish the control technique for simultaneously positioning two or more heads with high speed and with high precision, and this problem must be solved.

SUMMARY OF THE INVENTION

Accordingly, it is an object of the invention to provide a disk drive and positioning control system that are able to achieve the fast and precise positioning operation by two or more high-response, small-stroke precise-movement actuators and a low-response, large-stroke rough-movement actuator operated in cooperation with each other.

In order to achieve the above object, the present invention proposes a disk drive including a rough-movement actuator having a stroke enough to cover all disk, first and second precise-movement actuators capable of being moved by the rough-movement actuator and having a small stroke, and means for controlling the first precise-movement actuator to position a first head at a first track on a first disk surface and at the same time the second precise-movement actuator to position a second head at a second track on a second disk.

In addition, according to the invention, there is provided a disk drive including a rough-movement actuator having a stroke enough to cover all disk, first and second precise-movement actuators capable of being moved by the rough-movement actuator and having a small stroke, and means for controlling the first precise-movement actuator to position a first head at a first track on a first disk surface, at the same time the second precise-movement actuator to position a second head at a second track on a second disk and the rough-movement actuator to follow the positioning operation and to be positioned at the center position between the located first and second heads.

Also, according to the invention, there is provided a disk drive including a rough-movement actuator having a stroke enough to cover all disk, first and second precise-movement actuators capable of being moved by the rough-movement actuator and having small strokes, a first head to be driven by the first precise-movement actuator, a second head to be driven by the second precise-movement actuator, and means for supplying the sum of the amount of displacement of the first precise-movement actuator and the amount of displacement of the second precise-movement actuator, a first error signal produced after comparing a position signal from the first head with a first target value, a second error signal produced after comparing a position signal from the second head with the first target, and a signal resulting from adding and averaging the sum of the position signals, the first error signal and the second error signal to a feed-back compensator of said rough-movement actuator.

Moreover, according to the invention, there is provided a disk drive including a rough-movement actuator having a stroke enough to cover all disk, first and second precise-movement actuators capable of being moved by the rough-movement actuator and having small strokes, a first head to be driven by the first precise-movement actuator, a second head to be driven by the second precise-movement actuator, and means for controlling the first head opposing the surface of a first disk to previously record positional information on the surface of the first disk at constant intervals and the second head opposing the surface of a second disk to previously record positional information on the surface of the second disk in such a manner that the positional information recorded on the second disk is shifted out of phase from that recorded on the surface of the first disk.

Furthermore, according to the invention, there is provided a disk drive including a rough-movement actuator having a stroke enough to cover all disk, first and second precise-movement actuators capable of being moved by the rough-movement actuator and having small strokes, a first head to be driven by the first precise-movement actuator, a second head to be driven by the second precise-movement actuator, and means for controlling the second head to be moved to a target track on the surface of a second disk which the second head faces while the first head is being controlled to follow a track on the surface of a first disk which the first head faces, and after the movement, for controlling the second head to be switched to from the first head so that data can be written or read on or from the second disk.

The above countermeasures can be applied to other disk drives having three or more heads and three or more precise-movement actuators.

BRIEF DESCRIPTION OF THE DRAWINGS

FIGS. 2A to 2G are timing charts to which reference is made in explaining the operation of the invention.

DESCRIPTION OF THE EMBODIMENTS

Embodiments of the invention will be described in detail with reference to the accompanying drawings.

Figure 1:
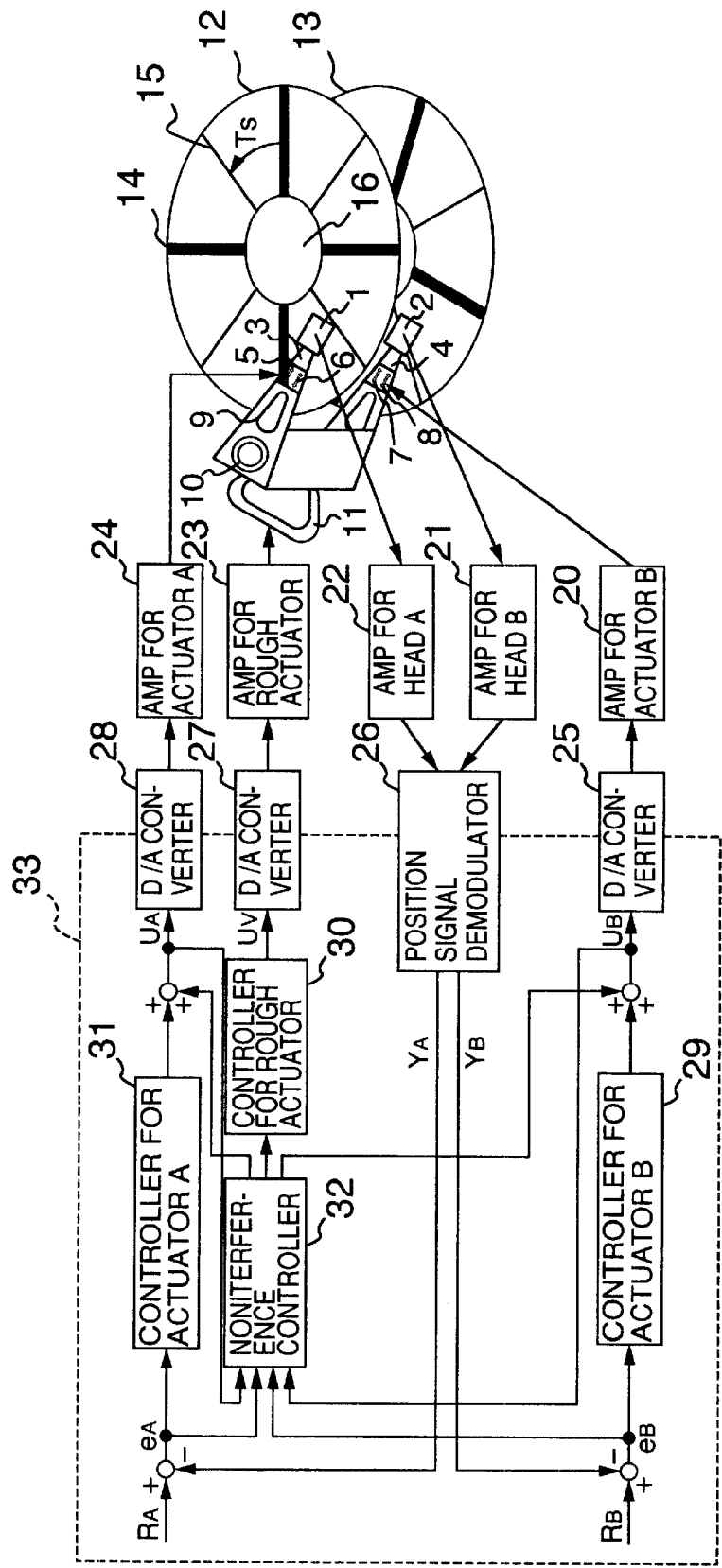
FIG. 1 is a block diagram of the hardware structure of a disk drive according to the invention.

FIG. 1 is a block diagram of the hardware showing one embodiment of a disk drive according to the invention. Magnetic disks 12, 13 are fast rotated at a constant rate by a spindle motor 16, and positional information 14, 15 are previously recorded on the disks at the heads of sectors of tracks.

In this magnetic disk drive, two magnetic heads A, B (1, 2) are used at a time to write and read data on and from the disks 12, 13 that are opposed face to face. The output data from or input data to the heads are supplied to or from head amplifiers 21, 22, respectively. The magnetic head A (1) is supported by a suspension or spring 3, which is driven by a piezo-electric element 5 and a piezo-electric element 6. The piezo-electric elements 5, 6 are supported by a carriage 9. When the piezo-electric elements 5, 6 extends and shrinks, respectively, the head is moved slightly. On the contrary, when the piezo-electric elements 5, 6 shrinks and extends, respectively, the head is slightly moved in the opposite direction. Similarly, the magnetic head B (2) is supported by a spring 4, which is driven by piezo-electric elements 7, 8. The piezo-electric elements 7, 8 are supported by the carriage 9.

The carriage 9 is all driven by a voice coil motor 11. The carriage 9, along with the movement of the voice coil motor, is rotated around its pivot shaft 10 in the direction from the outer periphery to inner periphery of the disks or in the opposite direction. Hereinafter, we call the piezo-electric elements 5, 6 as a precise-movement actuator A, the piezo-electric elements 7, 8 as a precise-movement actuator B, and the voice coil motor 11 as a rough-movement actuator.

Positional information is previously recorded on the disk 12 at intervals of time Ts. Here, as an example, two kinds of positional information 14, 15 are previously recorded thereon. The positional information 14 recorded includes a marker indicating the head of sector, an AGC (Automatic Gain Control) circuit, a track number and a burst signal for detecting relative position. The positional information 15 recorded includes only a marker and burst signal. The data region can be expanded by not recording the AGC and track number in all sectors. In addition, the same positional signal as on the disk 12 is recorded 90 degrees shifted in phase. This will decrease the numbers of positional signal demodulators 26 for demodulating the positional information and microprocessors 33 for calculating the control algorithms. The timing of the operation within the microprocessor will be described in detail later with reference to FIGS. 2A to 2G.

The positional signal demodulator 26 generates a head position signal $Y_A$. The position signal is compared with a target offset $R_A$. A controller 31 for precise-movement actuator A calculates the amount of operation of precise-movement actuator A. The precise-movement actuator A has a high mechanical resonance frequency of about 40 kHz. If the controller 31 for the precise-movement actuator has an integration characteristic provided, the precise-movement actuator A can be stably operated thereby. Similarly, a head position signal $Y_B$ is also generated and compared with a target offset $R_B$. A controller 29 for precise-movement actuator B calculates the amount of operation of precise-movement actuator B. If the controller 29 for precise-movement actuator B has also an integration characteristic provided, the precise-movement actuator B can be stably operated. A precise-movement non-interference controller 32 receives error $e_A$, error $e_B$, amount of operation uA and amount of operation uB and produces an amount of operation uV for driving the rough-movement actuator, an amount of correction for the amount of operation of precise-movement actuator A, and an amount of correction for the amount of operation of precise-movement actuator B.

The non-interference controller 32, although it will be described in detail later with reference to FIG. 3, fundamentally calculates the control algorithms so that the heads can be held in the optimum positions without the interference between the two precise-movement actuators and by detecting the operations of the two precise-movement actuators according to the operation of the rough-movement actuator. Since the two precise-movement actuators are limited in their moving ranges (here, ±1.1 μm), the precise-movement actuators are ordered to go out of their ranges depending on the positional relation between the rough-movement actuator and two precise-movement actuators. Thus, it is difficult to operate the actuators as they are desired. For example, the non-interference controller 32 controls the rough-movement actuator to be positioned at the center position which has the almost same distance from both the head A (1) driven by the precise-movement actuator A and the head B (2) driven by the precise-movement actuator B. The amounts of operation uA, uB, uV are converted from digital data to analog data by D/A converters 28, 25, 27 and supplied to amplifiers 24, 20, 23, respectively. The output data from the amplifiers control the piezo-electric elements 5, 6, piezo-electric elements 7, 8 and voice coil motor 11 to be driven. Here, the amplifier 24 for the precise-movement actuator A applies voltages of opposite signs to the piezo-electric elements 5, 6. The amplifier for the precise-movement actuator B also operates similarly. The elements within a block 33 treat digital signals and operate as a single microprocessor 33.

While a single microprocessor is used here to control the two heads at a time, two microprocessors can of course be used to easily make parallel arithmetic operations for driving the two heads.

FIGS. 2A to 2G are timing charts for the arithmetic operation of the hardware according to the invention shown in FIG. 1. When the marker of the position signal is read by the head A (1), an interruption flag 40 is generated at intervals of sampling time Ts. An interruption flag 41 of the position signal for the head B (2) is generated time Ts/2 after the generation of each flag 40.

These flags are generated in order that the positional information can be recorded 90 degrees out of phase on the disks 12, 13 as shown in FIG. 1. When the interruption flags 40, 41 of position signal are generated, the position signal demodulator 26 starts A/D conversion operation at 42, 43 and produces position signals $Y_A$, $Y_B$. The microprocessor 33 responds to the position signal $Y_A$ and calculates the amount of operation uA of precise-movement actuator A and the amount of operation uV of rough-movement actuator 11 at 44. When the amount of operation uA of the precise-movement actuator A is determined, the D/A conversion flag for the precise-movement actuator rises at 46 and starts D/A conversion. The analog data is supplied to the amplifier 24. When the amount of operation uV of the rough-movement actuator is determined, the D/A conversion flag for the rough-movement actuator rises and starts D/A conversion. The analog data is supplied to the amplifier 23.

In addition, the microprocessor 33 calculates the amount of operation uB of precise-movement actuator B and the amount of operation uV of the rough-movement actuator at 45, and just after that, raises a D/A conversion flag 47 for precise-movement actuator B and a D/A conversion flag 49 of the rough-movement actuator, starting D/A conversion. While the position signals recorded on disks 12, 13 are 90 degrees out of phase in this example, the out-of-phase deviation between the position signals may be arbitrary without being limited to 90 degrees.

The microprocessor 33 must process computations 44, 45 for the two precise-movement actuators and one rough-movement actuator. The current disk drive that positions the heads by only the rough-movement actuator and that employs sampling frequency Ts of 100 μs uses a clock frequency of 33 MHz to 50 MHz at which the microprocessor is operated. In order to widen the frequency band of the control system to 2 kHz or higher, the sampling frequency Ts must be lowered to about 50 μs.

In other words, it is necessary to increase the clock frequency of the microprocessor to double that frequency, or about 66 MHz to 100 MHz. In the conventional disk drive where one precise-movement actuator and one rough-movement actuator are operated, the addition of the computation for the control of the precise-movement actuator needs a clock frequency of about 1.5 times as high as that frequency, or 100 MHz to 150 MHz.

Moreover, the disk drive of the invention, in which two precise-movement actuators and one rough-movement actuator are operated together, needs a clock frequency of further about 1.5 times that frequency, or 150 MHz to 225 MHz. The computation capability of the microprocessor needs a clock frequency of about 150 MHz or above. The disk drive using this microprocessor can be produced at lower cost than the disk drive in which two microprocessors operated at a clock frequency of about 100 MHz are used to control two precise-movement actuators to operate in parallel.

Figure 3:
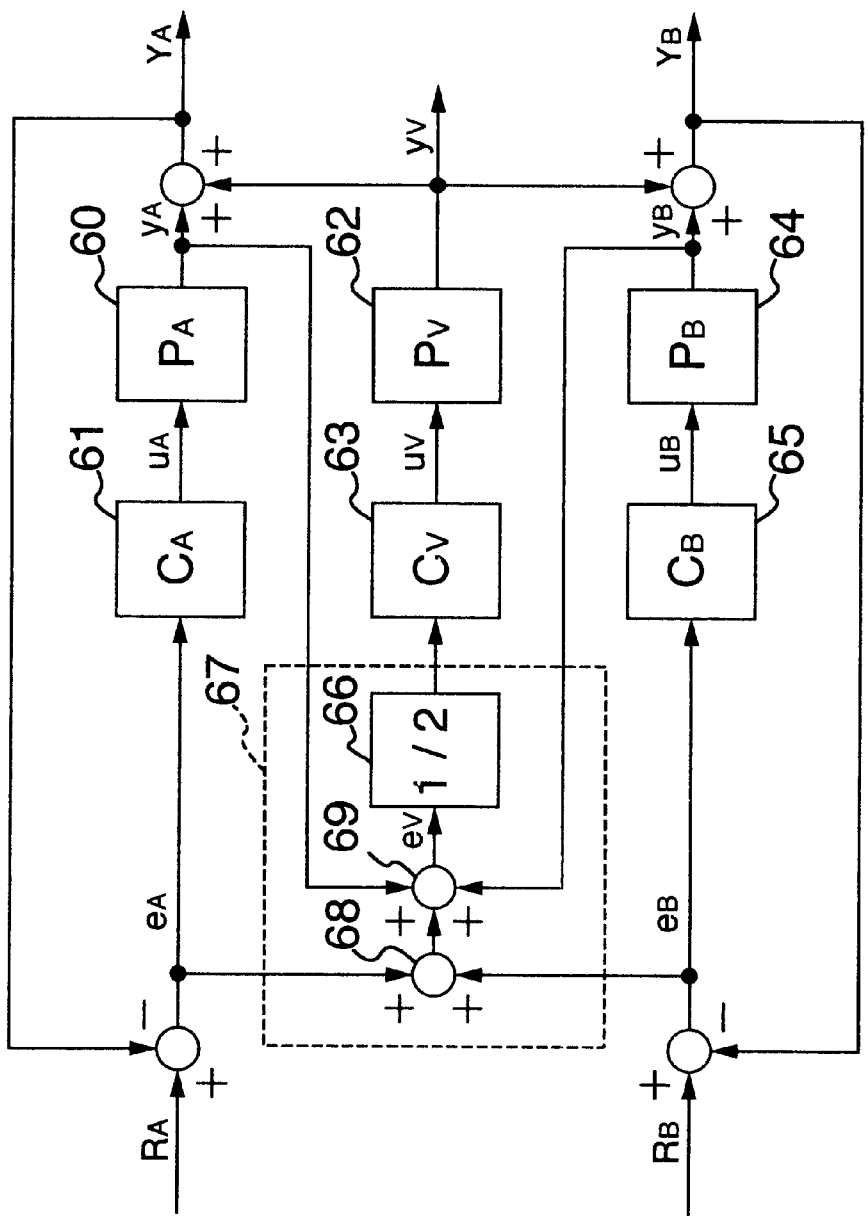
FIG. 3 is a circuit block diagram of one structure of the invention.

FIG. 3 is a block diagram of one example of the hardware structure of the embodiment according to the invention. There are shown a transfer function $P_A$ 60 ranging from the D/A converter 28 through the precise-movement actuator A (5, 6) to the position signal from the head A (1), and a transfer function $C_A$ 61 of the controller 31 for precise-movement actuator A. Similarly there are shown a transfer function $P_B$ 64 ranging from the D/A converter 25 through the precise-movement actuator B (7, 8) to the position signal from the head B (2), and a transfer function $C_B$ 65 of the controller 29 for precise-movement actuator B. In addition, there are shown a transfer function $P_V$ 62 ranging from the D/A converter 27 through the voice coil motor 11 to the characteristic of carriage 9, and a transfer function $C_V$ 63 of the controller 30 for the rough-movement actuator.

The non-interference controller 32 shown in FIG. 1 corresponds to a block 67 in FIG. 3. This non-interference block 67 has a few features. While two heads are positioned at a time here, this idea can be easily expanded to the structure in which three or more heads are positioned at a time. The first feature is that the feed-back signal $e_V$ to the controller 63 for the rough-movement actuator includes an added signal 68 of a position error signal $e_A$ of head A (1) and a position error signal $e_B$ of head B (2). The second feature is that an added signal 69 of a displacement signal $Y_A$ of precise-movement actuator A and a displacement signal $Y_B$ of precise-movement actuator B is also applied as the fee-back signal $e_V$ to the controller 63. The third feature is that those error signals $e_V$ are averaged.

In the actual system, since it is difficult to detect the displacements $Y_A$, $Y_B$ of the precise-movement actuators, the displacement $Y_A$ is estimated by use of the amount of operation uA considering the fact that the relation between the input and output of piezo-electric elements is substantially proportional. Also, it is possible to estimate the displacement $Y_A$ by use of, for example, a observer theory. Similarly, the displacement $Y_B$ is estimated. The rough-movement actuator is driven to decrease the position error $e_A$, $e_B$, while the deviations left after the response are compressed by the controllers 61, 65 for the precise-movement actuators. In addition, the rough-movement actuator is positioned at the center which has the almost same distance from both the output positions of precise-movement actuators A and B. Thus, it is possible to make the best use of the abilities of the precise-movement actuators of which the strokes are small.

The above discussion will be explained in detail by use of equations. The following equation is satisfied for the precise-movement actuator A.

$$Y_A = P_A C_A (R_A - Y_A) \tag{1}$$

Similarly, the following equation is satisfied for the precise-movement actuator B.

$$Y_B = P_B C_B (R_B - Y_B) \tag{2}$$

In addition, the head position signals are given by the following equations.

$$Y_A = y_A + Y_V \quad (3)$$

$$Y_B = y_B + Y_V \quad (4)$$

Moreover, the following equation is satisfied for the rough-movement actuator, and can be expanded by use of equations (3), (4).

$$yV = \tfrac{1}{2}P_V C_V(e_A + Y_A + e_B + Y_B) = \tfrac{1}{2} P_V C_V (R_A - Y_V + R_B - y_V) \quad (5)$$

From the equation (5) the position $Y_V$ of the rough-movement actuator is given by the following equation.

$$y_V = \frac{P_V C_V}{1 + P_V C_V} \cdot \frac{R_A + R_B}{2} \quad (6)$$

This equation means that the position $Y_V$ of the rough-movement actuator is determined by the average of the target position $R_A$ of precise-movement actuator A and the target position $R_B$ of minute-actuator B. The first term of the right side of the above equation shows a closed loop function formed of the rough-movement actuator and the controller for the rough-movement actuator. The frequency band of this closed loop characteristic is set to about 500 Hz.

In addition, substituting the equation (1) into the equation (3) will yield the position signal of head A as given by the following equation.

$$Y_A = \frac{P_A C_A}{1 + P_A C_A} R_A + \frac{1}{1 + P_A C_A} y_V \quad (7)$$

Substituting the equation (2) into the equation (4) will yield the position signal of head B as given by the following equation.

$$Y_B = \frac{P_B C_B}{1 + P_B C_B} R_B + \frac{1}{1 + P_B C_B} y_V \quad (8)$$

The equation (7) shows the relationship among the position signal $Y_A$ of the head A driven by the precise-movement actuator A, the target position $R_A$ and the position $Y_V$ of the rough-movement actuator. The relations from the target position $R_A$ to the head position $Y_B$ are defined by the closed loop system formed of the precise-movement actuator A and its controller. The relations from the rough-movement actuator to the head position $Y_B$ are defined by the sensitivity function formed of the precise-movement actuator A and its controller. Here, the frequency band of this closed loop characteristic is 2 kHz or above, and the sensitivity function has a compression ability at a lower frequency than 2 kHz. Thus, the motion of the position signal $Y_A$ is governed by the target position $R_A$ without being affected by the operation of the rough-movement actuator having relatively low frequency components defined by the equation (6). The same discussion for the precise-movement actuators B can be explained by use of equation (8).

Thus, it was found that according to the invention, the two heads can be positioned at target positions at a time by the precise-movement actuators and the rough-movement actuator can be positioned at the average of both positions.

If, for example, three heads are positioned at a time by use of three precise-movement actuators, the third position error signal is added to the adding point 68.

Also, the displacement signal of the third head is added to the adding point 69. Then, the resulting sum signal is divided by 3 in the block 66. Thus the rough-movement actuator can be positioned at the average of the operations of the three precise-movement actuators.

In addition, while the block 66 averages the current values, the position signals may be the feed-back signal $e_V$ resulting from moving arrange values in order to remove the effect of noise and vibration.

Figure 4A:
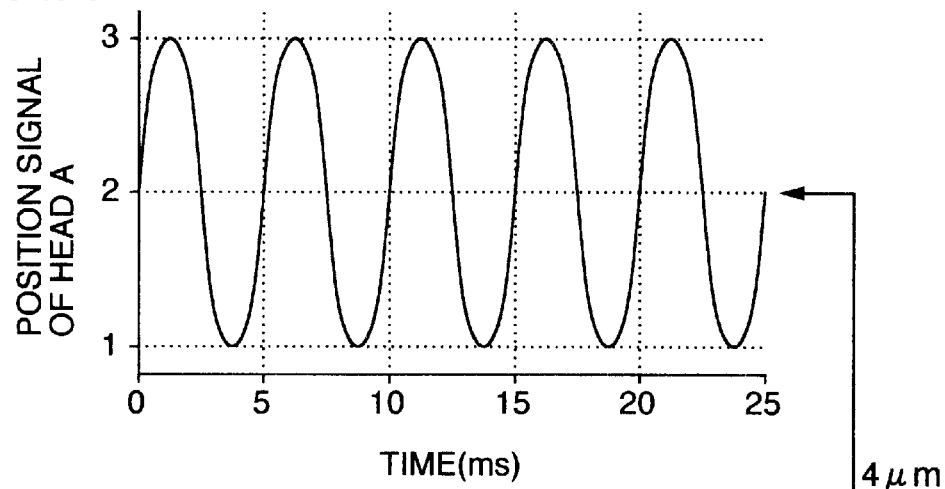
FIGS. 4A to 4C are diagrams of response waveforms obtained when a control technique of the invention is used.
Figure 4B:
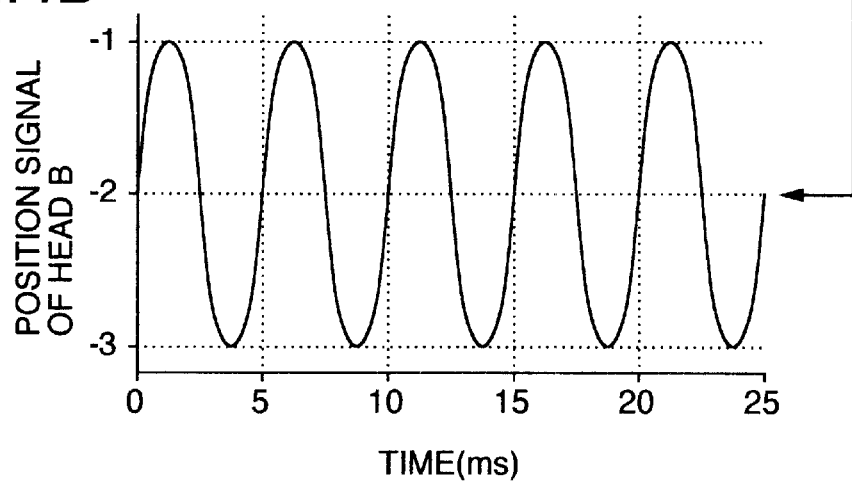
Figure 4C:
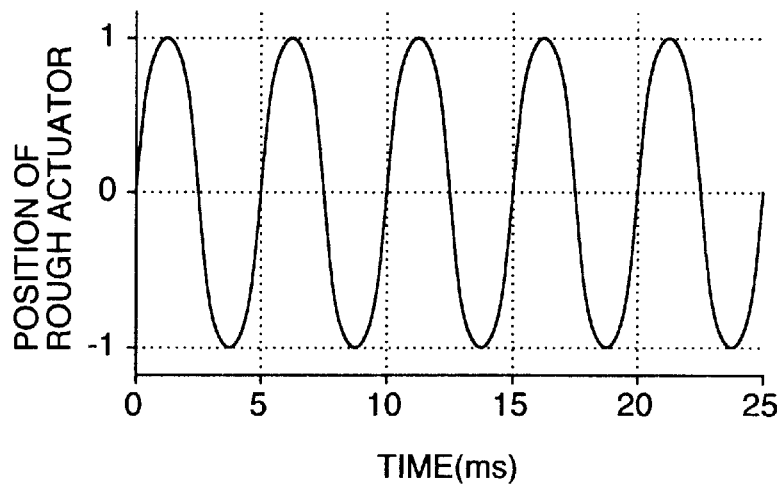

FIGS. 4A to 4C show examples of response wave-forms according to the invention. If the disks 12, 13 are rotated at a constant rate of 200 Hz, a synchronized vibration with a period of 5 ms is caused, and the head A (1) and head B (2) must follow that signal. Here, it is assumed that the disk 12 vibrates in a sine wave having a frequency of 200 Hz and an amplitude of ±1 μm, and that the disk 13 vibrates in synchronism with the vibration of the disk 12. In addition, it is assumed that the stroke of the precise-movement actuators is ±1.1 μm(2.2 μm, peak-to-peak). In this case, according to the invention, the head A is positioned in a form of the sine wave with its center at 2 μm, and the head B is positioned in a form of the sine wave with its center at -2 μm. The position $y_V$ of the rough-movement actuator is settled at the intermediate point between the position signals $Y_A$ and $Y_B$ of the heads A and B, or around 0 μm. Thus the amounts of off-track of heads A, B can be allowed up to a maximum of about 4 μm.

Figure 5A:
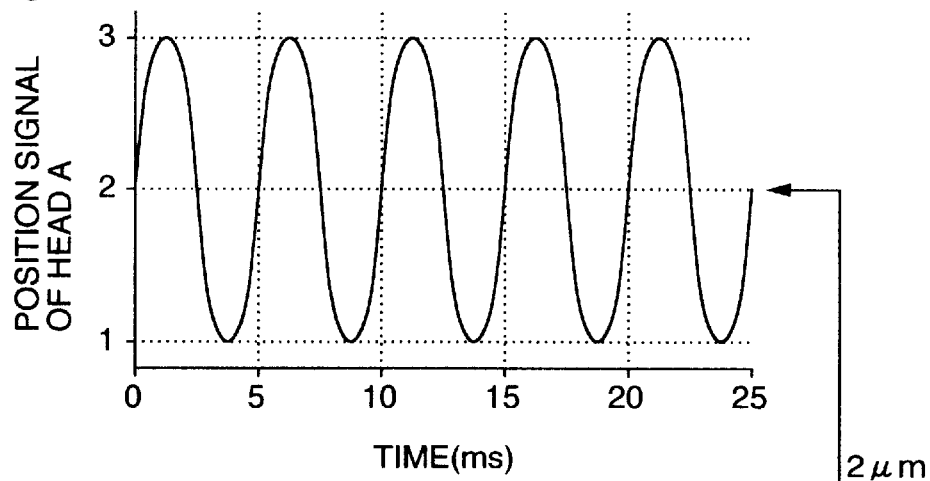
FIGS. 5A to 5C are diagrams of response waveforms obtained by a combination according to the prior art.
Figure 5B:
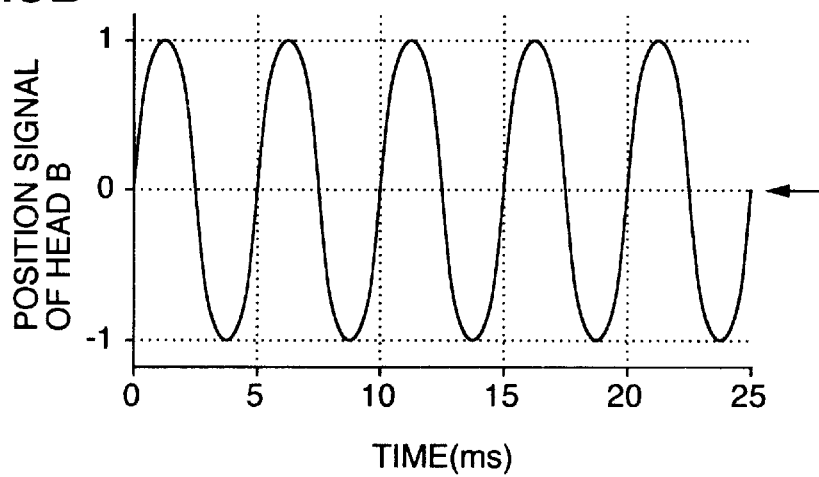
Figure 5C:
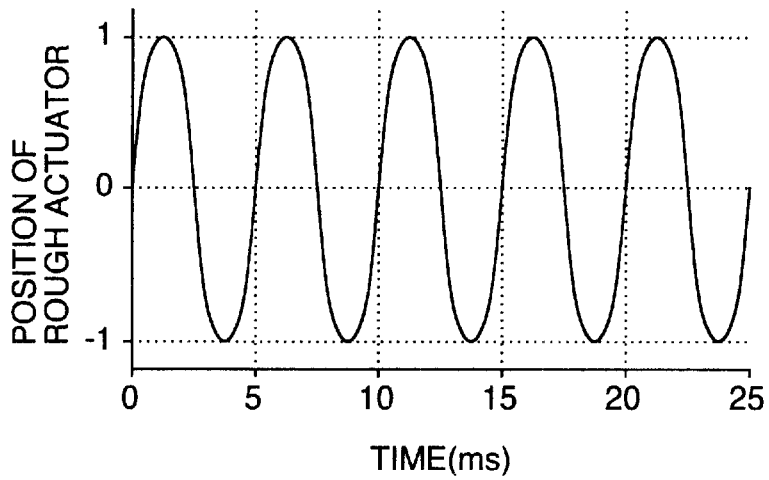

FIGS. 5A to 5C show response waveforms with the precise-movement actuator B and rough-movement actuator controlled in cooperation with each other and with the precise-movement actuator A operated independently in the structure shown in FIG. 8 (which will be described later) under the conditions of FIGS. 4A to 4C. In this case, the motion of the rough-movement actuator is the same as that of the precise-movement actuator B. At this time, the amount of off-track of the precise-movement actuator A can be allowed up to a maximum of 2 μm. However, since this amount is a half of the amount shown in FIGS. 4A to 4C, it will be understood that the control technique shown in FIG. 8 makes the operating range of the precise-movement actuators narrower.

FIG. 6 shows response waveforms according to the invention with the vibration periods of disks A, B shifted 180 degrees out of phase from each other. According to the invention, the rough-movement actuator may be at rest, and the precise-movement actuators A, B operate to follow the disk vibrations. In this case, the amounts of off-track of heads A, B can be allowed up to a maximum of 2 μm.

Figure 6A:
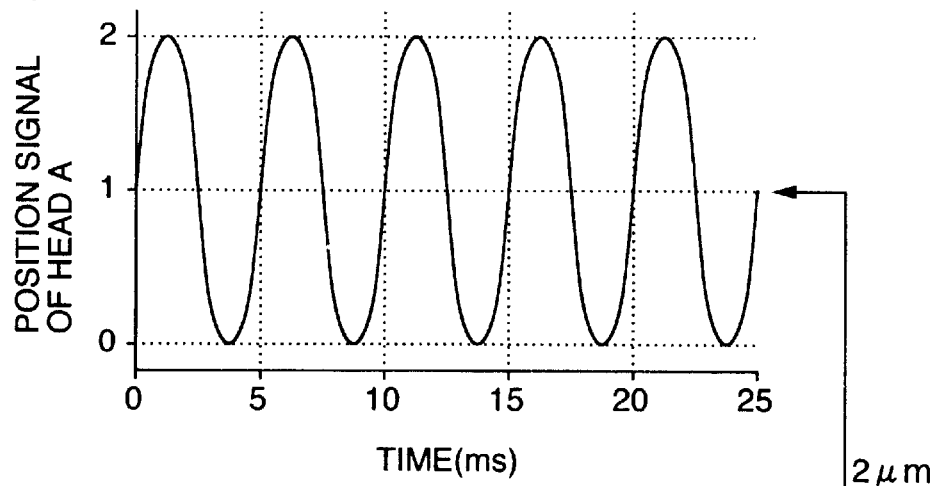
FIGS. 6A to 6C are diagrams of response waveforms obtained when a control technique of the invention is used.
Figure 6B:
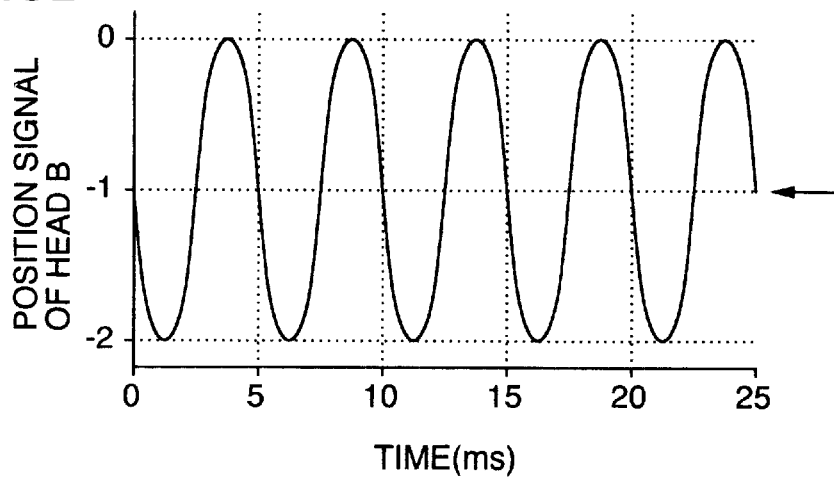
Figure 6C:
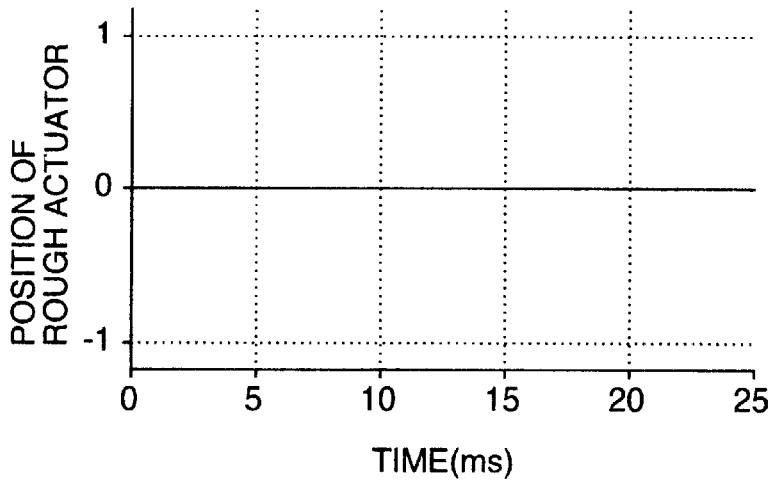
Figure 7A:
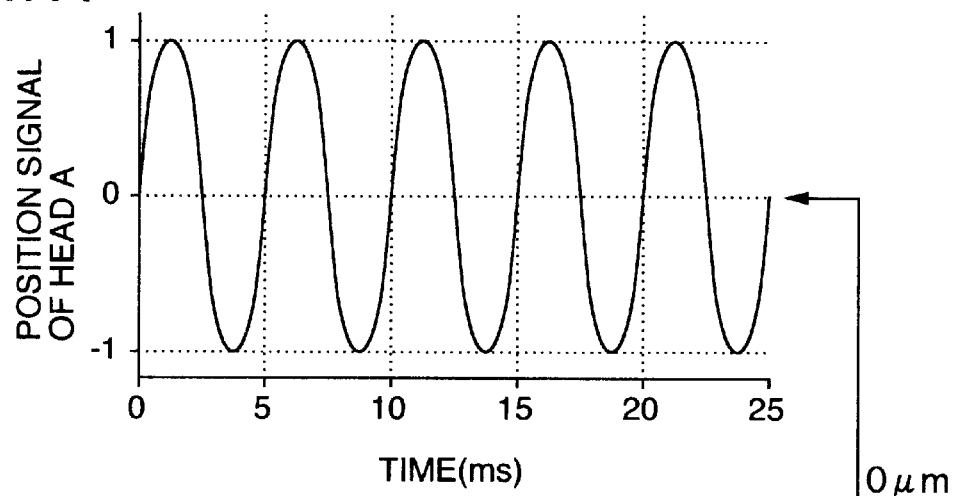
FIGS. 7A to 7C are diagrams of response waveforms obtained by a combination according to the prior art.
Figure 7B:
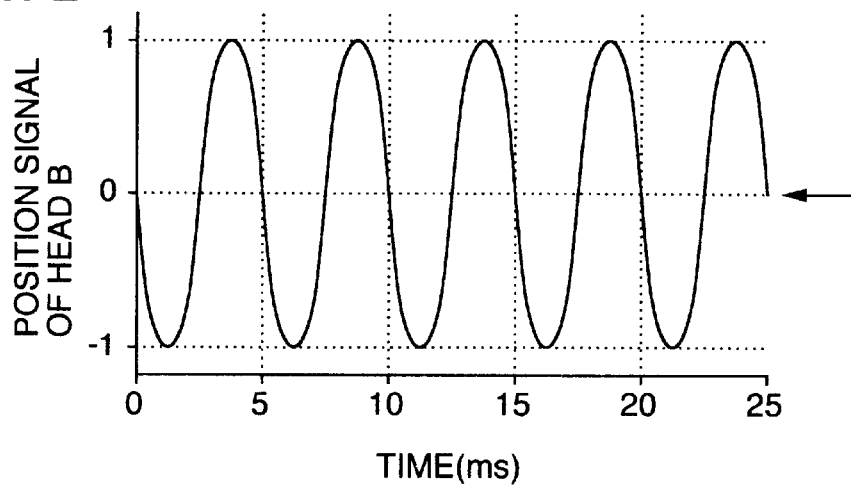
Figure 7C:
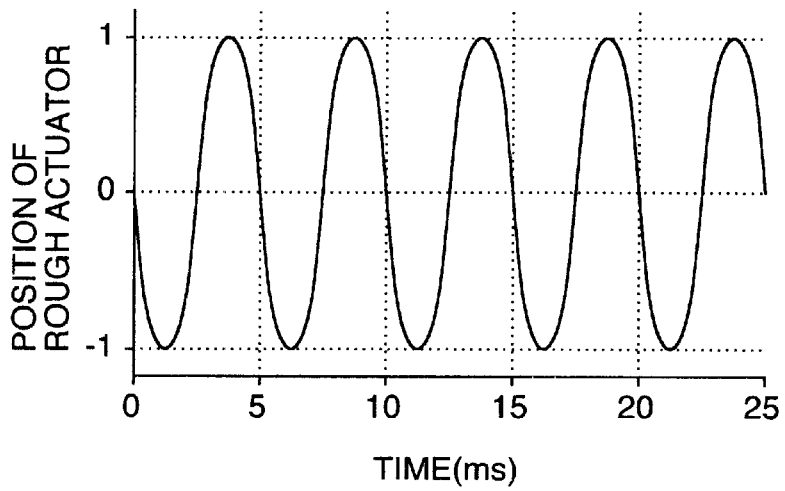
Figure 8:
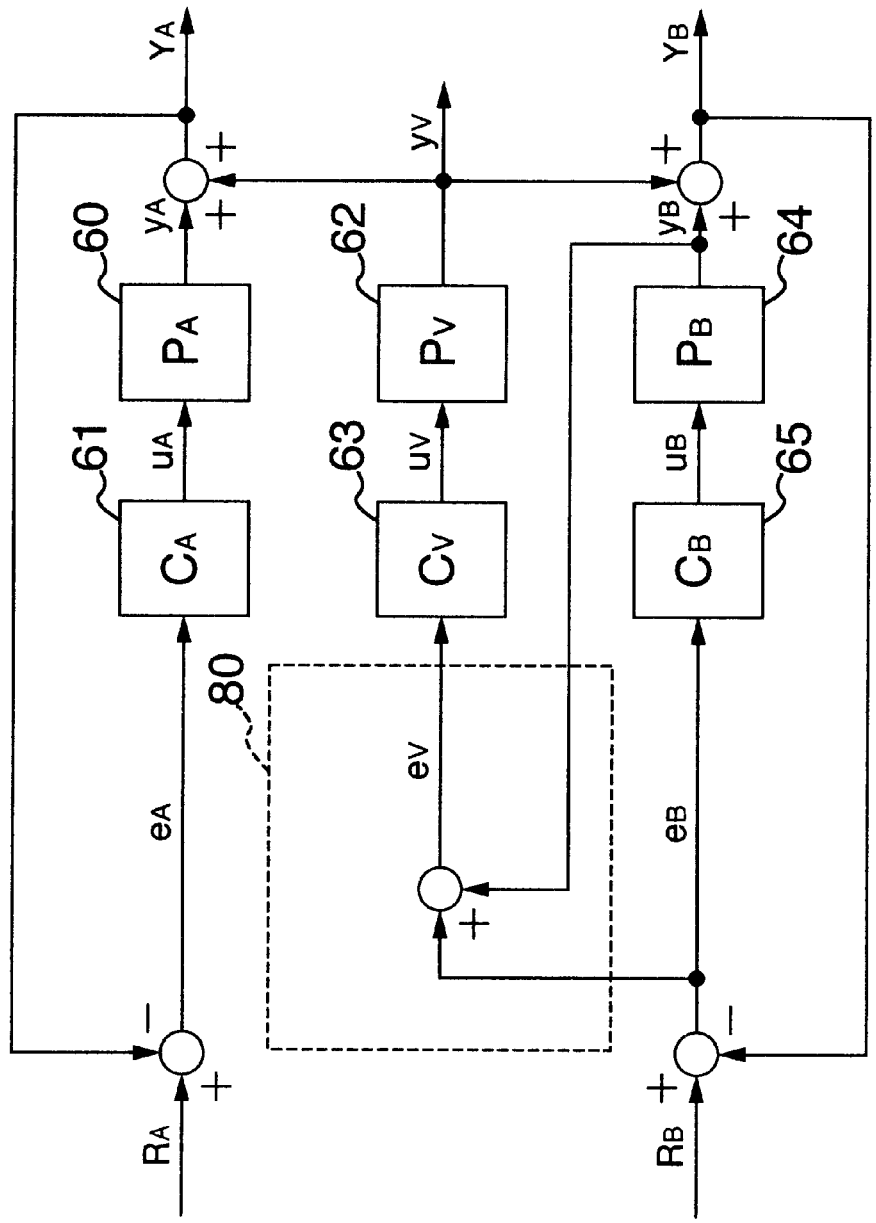
FIG. 8 is a circuit block diagram of another structure of the invention.

FIGS. 7A to 7C show response waveforms with the precise-movement actuator B and rough-movement actuator controlled in cooperation with each other and with the precise-movement actuator A operated independently in the construction shown in FIG. 8 under the conditions of FIGS. 6A to 6C. The motion of the rough-movement actuator is the same as that of the precise-movement actuator B. At this time, the allowed amount of off-track of precise-movement actuator A is 0. When the actuator is operated further off track, the operation is saturated so that it cannot follow with high precision any longer. Thus it will be understood that the control technique shown in FIG. 8 makes the operating range of the precise-movement actuators narrower.

The construction shown in FIG. 8 also enables two heads to be controlled at a time in their operations and is another embodiment of the invention. With this structure, the precise-movement actuator B and rough-movement actuator make cooperative control 80 so that the position signal $Y_B$ of the precise-movement actuator B can always follow the output $Y_V$ of the rough-movement actuator. However, since the precise-movement actuator A tries to position the head at the target track center independently of the motion of the rough-movement actuator, the operation of the precise-movement actuator with the stroke limited is saturated, with the result that high-precision positioning becomes difficult.

Figure 9:
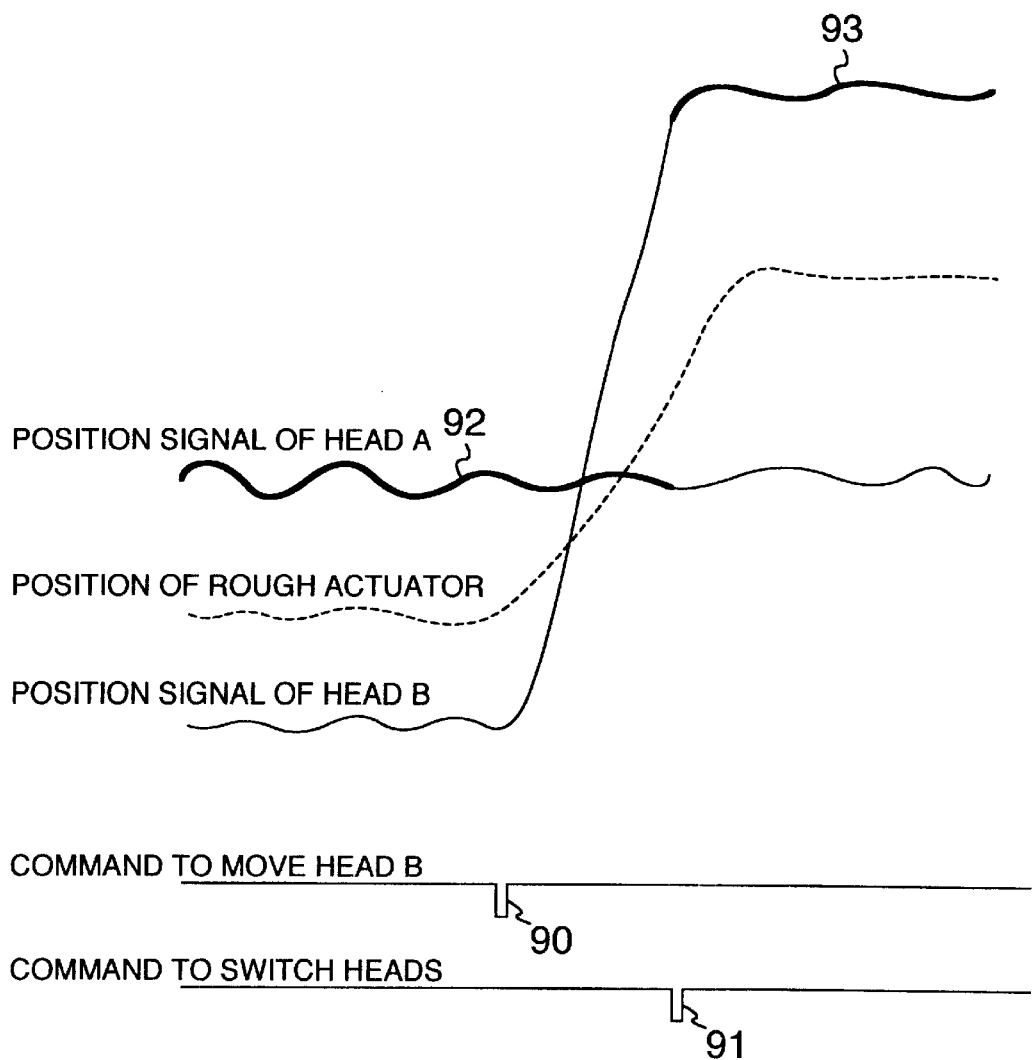
FIG. 9 shows response waveforms obtained when heads are switched according to a control technique of the invention.

FIG. 9 shows one example of response waveforms in the head switching operation when the precise-movement actuators A, B and rough-movement actuator are operated in the structure according to the invention shown in FIG. 3. The head A is controlled to follow the target track, supplying data 92 to the host controller. At this time, we assumes that the head B makes some operation. when the host controller sends a command 90 to the head B to shift to the target track, the head B starts shifting. When the head arrives at the target track, head switching is electrically made from head A to head B. Then, the head B sends data 93 to the host controller. Thus data can be read continuously. In the prior art, since two or more heads cannot be operated at a time, data is forced to stop sending during the time from when a shift command is issued to the aimed head to when the aimed head is settled on the target track. The rough-movement actuator shifts around the center between the heads A, B.

While a magnetic disk drive is used in the above embodiment, the present invention is able to realize a drive for other recording media, such as optical disks and DVD-RAM.

Moreover, while specific values are used in the above embodiment, the present invention is not limited thereto, but may use arbitrary values.

The present invention provides a disk drive and positioning control system capable of fast and precise positioning the heads by cooperative operation of two or more high-response small-stroke precise-movement actuators and a low-response large-stroke rough-movement actuator. According to the present invention, a plurality of precise-movement actuators of which the strokes are limited can be controlled at a time to position the heads, and particularly the heads can be fast switched by increasing the data transfer speed and positioning the head B in advance while the head A is operating.

What is claimed is:

1. A disk drive comprising:
   a rough-movement actuator having a stroke large enough to cover all of a disk;
   a first and a second precise-movement actuator capable of being moved by said rough-movement actuator and having small strokes; and
   means for controlling said first precise-movement actuator to position a first head at a first track on a surface of a first disk, and at the same time for controlling said second precise-movement actuator to position a second head at a second track on a surface of a second disk, and for controlling said rough-movement actuator to follow said positioning operation and to be brought to a center position between positions of said first and second heads.

2. A disk drive comprising:
   a rough-movement actuator having a stroke large enough to cover all of a disk;
   first and second precise-movement actuators capable of being moved by said rough-movement actuator and having small strokes;
   a first head to be driven by said first precise-movement actuator;
   a second head to be driven by said second precise-movement actuator; and
   means for supplying the sum of the amount of displacement of said first precise-movement actuator and the amount of displacement of said second precise-movement actuator, a first error signal produced after comparing a position signal from said first head with a first target value, a second error signal produced after comparing a position signal from said second head with said first target, and a signal resulting from adding and averaging the sum of said position signals, said first error signal and said second error signal to a feed-back compensator of said rough-movement actuator.

3. A disk drive comprising:
   a rough-movement actuator having a stroke large enough to cover all of a disk;
   a first and a second precise-movement actuator capable of being moved by said rough-movement actuator and having small strokes;
   a first head to be driven by said first precise-movement actuator;
   a second head to be driven by said second precise movement actuator; and
   means for controlling said first head opposing a surface of a first disk to previously record positional information on the surface of said first disk at constant intervals and said second head opposing a surface of a second disk to previously record positional information on the surface of said second disk in such a manner that said positional information recorded on said second disk is shifted out of phase from that recorded on the surface of said first disk.

4. A disk drive according to claim 3, further comprising arithmetic operation means for alternately making an arithmetic operation for control of said first precise-movement actuator and an arithmetic operation for control of said second precise-movement actuator.

5. A disk drive comprising:
   a rough-movement actuator having a stroke large enough to cover all of a disk;
   a first and a second precise-movement actuator capable of being moved by said rough-movement actuator and having small strokes;
   a first head to be driven by said first precise movement-actuator;
   a second head to be driven by said second precise movement actuator; and
   means for controlling said second head to be moved to a target track on a surface of a second disk which said second head faces, and for controlling said rough-movement actuator to be moved toward a midpoint position between positions of said first and second heads while said first head is being controlled to follow a track on the surface of a first disk which said first head faces, and after said movement of said second disk, for controlling said second head to be switched to or from said first head so that data can be written or read on or from said second disk.

6. A disk drive comprising:
   a rough-movement actuator having a stroke large enough to cover all of a disk;
   a first precise-movement actuator capable of being moved by said rough-movement actuator and having a limited stroke length of A $\mu$m; and
   a second precise-movement actuator capable of being moved by said rough-movement actuator having a limited stroke length of B $\mu$m, wherein the sum of an offset relative to said first precise-movement actuator and an offset relative to said second precise-movement actuator is (A+B) $\mu$m or below while a first head is controlled to move on a first track on a surface of a first disk and simultaneously a second head is controlled to move on the surface of a second disk.

* * * * *